United States Patent [19]
Paek

[11] Patent Number: 5,339,321
[45] Date of Patent: Aug. 16, 1994

[54] DECODING SIGNAL ERROR CONCEALMENT SYSTEM

[75] Inventor: Seung-kwon Paek, Seoul, Rep. of Korea

[73] Assignee: Samsung Electronics Co., Ltd., Kyunggi-do, Rep. of Korea

[21] Appl. No.: 669,466

[22] Filed: Mar. 14, 1991

[30] Foreign Application Priority Data

Jun. 29, 1990 [KR] Rep. of Korea ............... 90-9769

[51] Int. Cl.$^5$ ................................ G11B 20/18
[52] U.S. Cl. ........................ 371/31; 358/314; 348/624
[58] Field of Search ............ 358/314, 36, 336, 133; 371/31; 360/38.1

[56] References Cited

U.S. PATENT DOCUMENTS

| | | | |
|---|---|---|---|
| 4,376,290 | 3/1983 | Shirota | 358/314 |
| 4,807,033 | 2/1989 | Keesen et al. | 358/167 |
| 4,807,033 | 2/1989 | Keesen et al. | 358/167 |
| 4,891,699 | 1/1990 | Hamada et al. | 358/136 |
| 4,897,724 | 1/1990 | Veldhuis | 358/166 |
| 4,979,037 | 12/1990 | Mizutani et al. | 358/133 |
| 4,979,040 | 12/1990 | Masumoto | 358/138 |
| 5,122,876 | 6/1992 | Aoki | 358/133 |

*Primary Examiner*—Stephen M. Baker
*Attorney, Agent, or Firm*—Leydig, Voit & Mayer

[57] ABSTRACT

A decoding signal error concealment system for concealing data which are determined as errors during the process of decoding coded image data into signals in a digital VTR system including an error correction decoder, a block data selecting unit a block data decoding unit, an address and control signal generating unit, a line memory unit and a filtering data selecting unit. The system substitutes error data with image data of the preceding frame when reproducing image data which includes error data, thus enabling substitution of image data including chrominance signals, and prevents boundary effects of the substituted image data.

6 Claims, 2 Drawing Sheets

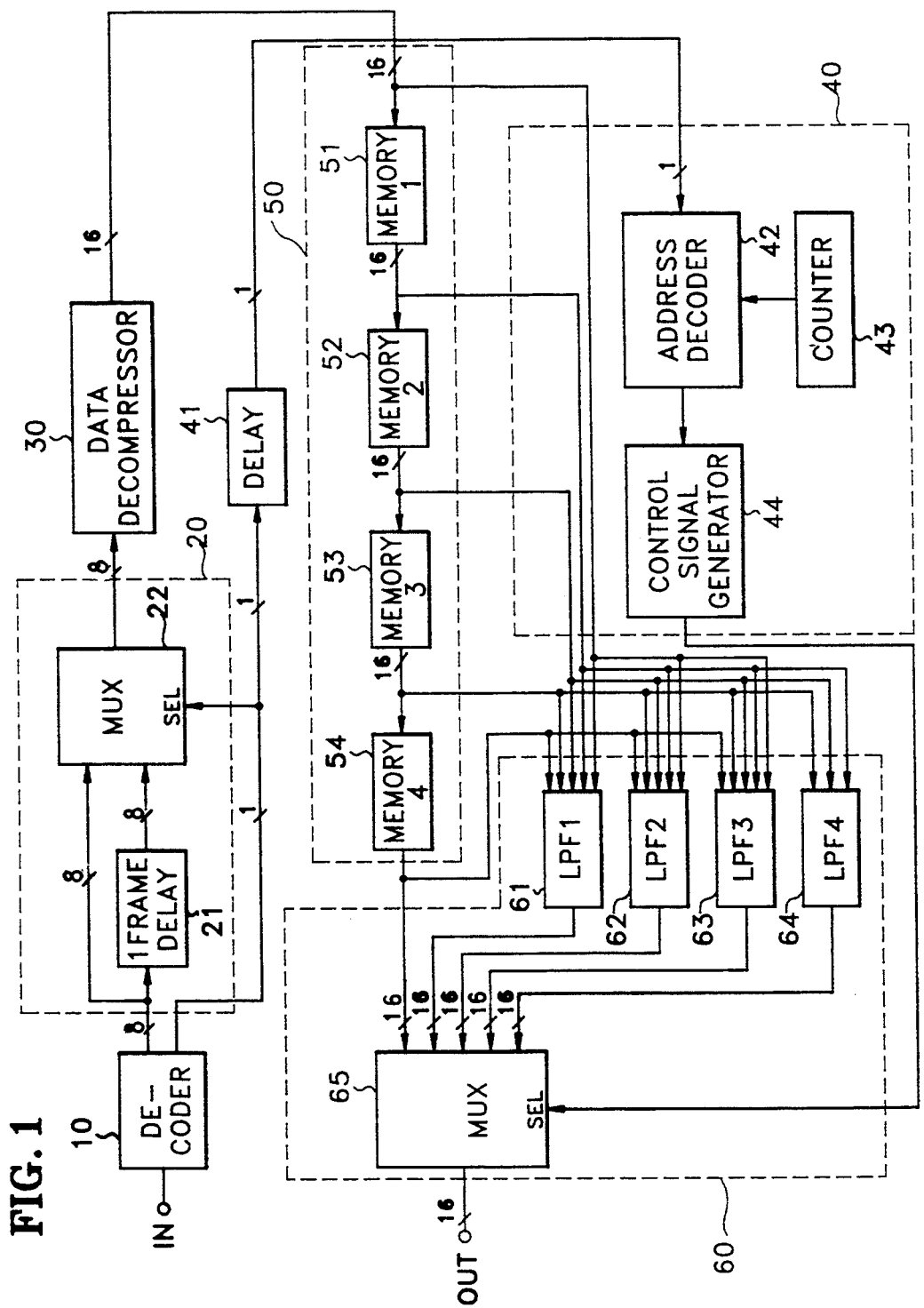

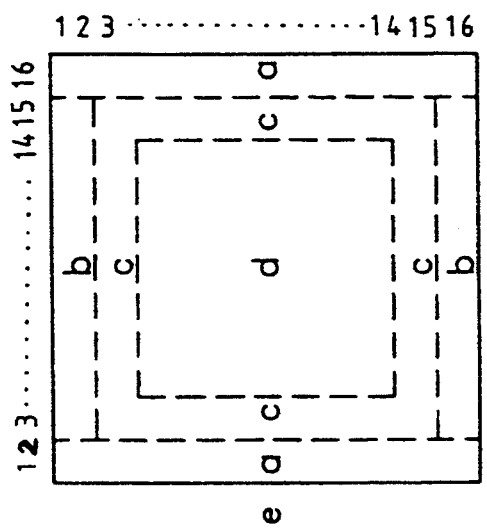

DECODING SIGNAL ERROR CONCEALMENT SYSTEM

BACKGROUND OF THE INVENTION

The present invention relates to a decoding signal error concealment system, and more particularly to a decoding signal error concealment system for correcting data which are determined as errors during the process of transforming coded image data into decoding signals in a digital VTR system.

Generally, to record image signals using a digital VTR system, the input image signal is transformed into a digital signal and is then input to the digital processing unit. The digital processing unit mentioned above transforms the time axis of the input digital signal, and compress the bit transfer rate to achieve high efficiency coding which decreases the number of bits of the image data information to be recorded.

By the above action, the image data having the compressed bit transfer rate is modulated for recording with the code for error correction added, and is then recorded on tape through the magnetic head.

Meanwhile, in order to reproduce the above image data recorded on tape, the data on the tape is read out by the head, and changed through detector to the data that existed before modulation, and is then input to the digital processing unit. The above digital processing unit corrects the data error due to burst error from damaged tape or random noise, and decodes the original image from the tape and transforms it into an analog signal.

The error concealment systems of conventional digital VTR systems which operate on the principles stated above, in the reaction between the data determined to be burst errors or errors due to random noise and the surrounding image element, the systems are designed to filter errors by applying the error data and a specified number of image elements as a block to a low pass filter. However, by coding a specified number of image elements as a block and recording that block on tape, the data determined as error affects the entire block containing the error data, during the playback of the data recorded on the tape and creates the problem of having the entire block processed as an error.

SUMMARY OF THE INVENTION

Accordingly, it is an object of this invention to provide a decoding signal error concealment system which substitutes error data with the previous data of a screen to conceal data determined as errors when coded image data is decoded in a digital VTR system, and apply low pass filters suited to the position of each image element in order to remove boundary effects arising from this substitution process.

To accomplish the object stated above, there is provided a decoding signal error concealment system for a digital VTR system for reproducing image data and removing error signals in the image data which is recorded on tape coded in N×N blocks, which system comprises:

an error correction decoder for outputting specified bits of data corresponding to image data recorded on tape in coded form and an error flag, a first block data selecting unit for selecting between specified bits of data transmitted from one side of the error correction decoder and the data preceding this transmitted data by a certain frame according to the level of the error flag signal transmitted from the other side of the error correction decoder, a second block data decoding unit for separating a certain byte of code selectively output from the first block data selecting unit into luminance and chrominance blocks of N×N bytes of image elements, and decoding the same, an address and control signal generating unit for generating an address recognizing the position of the image element within the N×N block according to the level of the error flag output from the other side of the above error correction decoder and outputting a control signal according to this address, a line memory unit for sequentially storing the data separated into luminance and chrominance in the above block data decoder into a plurality line memories serially connected to the output terminal of the block data decoder, and a filtering data selecting unit for filtering data transmitted from the input and output of the serially connected line memories and for selecting output approximating the position of the selected image element according to the control signal output from the above address and control signal generating unit.

BRIEF DESCRIPTION OF THE DRAWINGS

The above object and features of this invention will become apparent from the following description of an embodiment which incorporates the above features and is shown in the accompanying figures.

FIG. 1 is a block diagram of the decoding signal error concealment system according to this invention.

FIG. 2 is a field diagram of the low pass filters showing the applicable region in case of a 16×16 block according to FIG. 1.

FIG. 3 is a code table for the low pass filters according to FIG. 2.

DETAILED DESCRIPTION OF THE INVENTION

FIG. 1 is a block diagram of the decoding signal error concealment system according to this invention.

In FIG. 1, the decoding signal error concealment system according to this invention comprises an error correction decoder unit 10 for outputting respectively, the 8 bit data corresponding to the image data encoded in the form of 16×16 image element blocks recorded on tape and the error flag signal. A block data selecting unit 20 is composed of a delay device 21 for delaying the 8 bit data output from one terminal of the above error correction decoder 10 by one frame, and a multiplexer 22 which receives as input the 8 bit data output from one terminal of the above error correction decoder 10 and the 8 bit data which is delayed by one frame from the above delay device 21 and selectively outputs the input data according to the level of the error flag transmitted from the other terminal of the error correction decoder 10. A block data decoder 30 is provided for decoding the 54 byte code output for the above block data selecting unit 20 into the luminance and chrominance blocks consisting of 16×16 byte image elements.

Address and control signal generating unit 40 includes a delay device 41 for delaying the error flag output from the other terminal of the above error correction decoder 10 for a fixed time, an address decoder 42 for accepting the error flag signal output from the above delay device 41 and generating an address recognizing the position of the image element within the 16×16 block, a counter 43 for counting the address generated by the above address decoder 42, and a control signal generator 44 for outputting the control signal according to the address generated by the above address decoder 42. A line memory unit 50, composed of line memories 51,52,53,54 serially connected to the output terminal of the block data decoding unit 30, is provided to sequentially store in memory the data which is separated into luminance and chrominance blocks in the above block data decoding unit 30. A filtering data selecting unit 60 includes low pass filters 61,62,63 and 64 which respectively filter the data transmitted at the inputs and outputs of the line memories 51,52,53,54 serially connected to the above line memory unit 50, and a mulitplexer 65 which accepts as inputs the output data of the above line memory 54 and the output data of the above low pass filters 61–64 and selectively outputs the input signals according to the control signal generated by the above control signal generator 44.

A detailed explanation of the operation of the above described system of this invention is as follows.

In FIG. 1, in the process of reproducing the 16×16 blocks of luminance and chrominance data encoded in 54 bytes and recorded on tape, if a burst error generated by damage in the tape or an error in data generated by random noise is generated within the 54 byte code, the error flag output from the other terminal of the error correction decoder 10 goes to a "high" level state. Therefore, a "high" level is applied to the selection terminal SEL of the multiplexer 22 which is part of the block data selection unit 20, and the code from the preceding frame is transmitted to the block data decoding unit 30 from the multiplexer 22. When the error flag is at a "high" level, the data in the 54 byte code output from one terminal of the error connection decoder 10 is not stored in the one-frame delay device 21. The code of the preceding frame input to the other terminal of the above multiplexer 22 is the error-free data output from the delay device 21. If there is no error in the data output from one terminal of the above error correction decoder 10, the error flag takes "low" level and the multiplexer 22 outputs the present code without error.

The 54 byte code output from the above multiplexer 22 is decoded into blocks consisting of 16×16 image elements in the block data decoding unit 30 and separated into luminance and chrominance blocks. Here, the above luminance and chrominance blocks are each made up of 16×16 bytes.

If error data is input to the above error correction decoder 10 and the data of the preceding frame delayed by the delay device 21 is output from the block data decoding unit 30, a boundary effect is generated, where the high frequency components become more pronounced at the periphery of the 16×16 byte blocks. Therefore, to prevent the boundary effect generated by the above block data decoding unit 30, the output data of the block data decoding unit 30 is sequentially stored in the line memories 51,52,53,54 which make up the line memory unit 50, and the output data of the above block data decoding unit 30 and the output data of the line memories 51,52,53,54 are filtered through the low pass filters 61,62,63,64 connected to the input and output terminals of the above line memories 51,52,53,54.

Meanwhile, the address decoder 42 which makes up the address and control signal generating unit 40 receives the error flag signal through the delay device 41 and generates an address recognizing the position of the image element within the 16×16 block of the low pass filter fields a,b,c,d shown in FIG. 2 and a control signal is generated by the control signal generator 44 connected to the address decoder 42 so that the most suitable filter of low pass filter 61, 62, 63, 64, is selected from the address generated by the above address decoder 42 and is applied to the select terminal SEL of the multiplexer 65.

Here, the fields a,b,c,d within the 16×16 block as shown in FIG. 2 represent the applicable regions of low pass filters 61,62,63,64 and the field e of FIG. 2 represents the error free data block which is not filtered.

According to the control signal of the above control Signal generator 44, the multiplexer 65 selectively transmits the output data of the line memory 54 and the low pass filters 61,62,63,64 to the output terminal out.

FIG. 3 shows the code tables for the above low pass filters 61,62,63,64, respectively.

As stated above, this invention substitutes error data with image data of the preceding frame when reproducing image data which includes error data, thus enabling substitution of image data including chrominance signals, prevents boundary effects of the substituted image data by filtering by low pass filters, selects suitable low pass filters according to the position of the image element within the block, thus providing advantages of being suited to the user's visual characteristics.

What is claimed is:

1. A decoding error concealment system for a digital VTR system for reproducing image data and removing error signals in the image data which is coded in N×N blocks where N is greater than 1 and recorded on tape comprising:

an error correction decoder for outputting specified bits of data corresponding to coded image data recorded on tape and an error flag signal, respectively;

a block data selecting unit for selecting between specified bits of data transmitted from one terminal of the said error correction decoder and data from a fixed frame preceding the transmitted data according to the level of the error flag signal transmitted from the other terminal of the error correction decoder;

a block data decoding unit for separating specified bytes of code selectively output from said block data selecting unit into luminance and chrominance blocks of N×N bytes of image elements and decoding the blocks;

an address and control signal generating unit for generating an address for recognizing the position of the image element within the N×N block according to the level of the error flag output from the other terminal of the said error correction decoder and outputting a control signal according to this address, a line memory unit for sequentially storing the data separated into luminance and chrominance blocks by said block data decoding unit into several line memories serially connected to an output terminal of said block data decoding unit, and a filtering data selecting unit for filtering data transmitted from input and output terminals of the serially connected line memories of said line memory unit and for selecting a filtered output in dependence upon the position of the image element within the N×N block of image elements selected by said block data selecting unit according to the control signal output from said address and control signal generating unit to reproduce the filtered output.

2. A decoding signal error concealment system as claimed in claim 1 wherein the block data selecting unit includes:

a delay device for delaying data output from one terminal of the said error correction decoder by one frame; and a multiplexer which receives as input data output from one terminal of the said error correction decoder and data which is delayed by one frame from the delay device and selectively outputs the input data according to the level of the error flag transmitted from the other terminal of the error correction decoder.

3. A decoding signal error concealment system as claimed in claim 1 wherein the block data decoding unit decodes code output from said block data selecting unit into luminance and chrominance blocks consisting of 16×16 byte image elements.

4. A decoding signal error concealment system as claimed in claim 1 wherein the address and control signal generating unit includes:

a delay device for delaying the error flag output from the other terminal of the said error correction decoder for a predetermined time;

an address decoder for accepting the error flag signal output from the delay device and generating an address for recognizing the position of the image element within the N×N block;

a counter for counting the address generated by the address decoder, and a control signal generator for outputting a control signal according to the address generated by the address decoder.

5. A complex signal error concealment system as claimed in claim 1 wherein the line memory unit includes:

a plurality of line memories serially connected to the output terminal of the block data decoding unit to sequentially store in memory the data contained in the luminance and chrominance blocks.

6. A decoding signal error concealment system as in claim 5 wherein the filtering data selecting unit includes:

a plurality of low pass filters which respectively filter the data transmitted at the inputs and outputs of the plurality of line memories serially connected to said line memory unit; and a multiplexer which accepts as inputs the output data of a line memory and the output data of the low pass filters and selectively outputs the input signals according to a control signal generated by the control signal generator.

* * * * *